(12) United States Patent
Du et al.

(10) Patent No.: US 11,251,930 B2
(45) Date of Patent: Feb. 15, 2022

(54) CONTROL INFORMATION TRANSMISSION METHOD

(71) Applicant: HUAWEI TECHNOLOGIES CO., LTD., Guangdong (CN)

(72) Inventors: Bai Du, Shanghai (CN); Peng Zhang, Shanghai (CN); Huajia Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/915,757

(22) Filed: Jun. 29, 2020

(65) Prior Publication Data
US 2020/0328866 A1 Oct. 15, 2020

Related U.S. Application Data

(63) Continuation of application No. PCT/CN2018/123629, filed on Dec. 25, 2018.

(30) Foreign Application Priority Data

Dec. 29, 2017 (CN) .......................... 201711490121.9

(51) Int. Cl.
*H04L 5/00* (2006.01)
*H04W 72/12* (2009.01)

(52) U.S. Cl.
CPC ............ *H04L 5/0096* (2013.01); *H04L 5/001* (2013.01); *H04L 5/0037* (2013.01);
(Continued)

(58) Field of Classification Search
CPC ..... H04L 5/001; H04L 5/0037; H04L 5/0053; H04L 5/0064; H04L 5/0087;
(Continued)

(56) References Cited

U.S. PATENT DOCUMENTS

2016/0113008 A1* 4/2016 Damnjanovic ....... H04W 72/14 370/336
2017/0353963 A1* 12/2017 Hong .................. H04W 72/082
(Continued)

FOREIGN PATENT DOCUMENTS

CN 106455081 A 2/2017
CN 106455103 A 2/2017
(Continued)

OTHER PUBLICATIONS

ZTE; "About pre-emption indication"; 3GPP TSG RAN WG1 NR Ad-Hoc#2 Qingdao, CHINA, Jun. 27-30, 2017; R1-1710123 (Year: 2017).*
(Continued)

*Primary Examiner* — Gary Mui
(74) *Attorney, Agent, or Firm* — Leydig, Voit & Mayer, Ltd.

(57) ABSTRACT

This application provides a control information transmission method, and relates to the field of wireless communications. The method includes: determining, by a terminal device, whether to monitor an uplink preemption indication (PI) based on whether a time-frequency resource used to transmit uplink data overlaps a reference uplink resource (RUR), to effectively avoid blind detection performed on the uplink PI by terminal devices that do not need to receive the uplink PI, and reduce overheads of blind detection performed on the uplink PI by the terminal devices.

15 Claims, 7 Drawing Sheets

Communications apparatus 1500

Processing circuit 1510

Transceiver circuit 1520

(52) U.S. Cl.
CPC .......... *H04L 5/0064* (2013.01); *H04L 5/0087* (2013.01); *H04W 72/1247* (2013.01); *H04W 72/1268* (2013.01); *H04W 72/1289* (2013.01)

(58) Field of Classification Search
CPC ............ H04L 5/0096; H04W 72/1242; H04W 72/1247; H04W 72/1268; H04W 72/1289
See application file for complete search history.

(56) References Cited

U.S. PATENT DOCUMENTS

| | | | |
|---|---|---|---|
| 2018/0279326 A1* | 9/2018 | Park | H04W 72/1289 |
| 2018/0332608 A1* | 11/2018 | Guo | H04W 72/1289 |
| 2019/0098612 A1* | 3/2019 | Babaei | H04W 72/1289 |
| 2019/0166625 A1* | 5/2019 | Nam | H04L 1/0058 |
| 2019/0297638 A1* | 9/2019 | Park | H04W 72/042 |
| 2019/0327748 A1* | 10/2019 | Yang | H04W 28/16 |
| 2020/0059331 A1* | 2/2020 | Wong | H04L 5/0094 |
| 2020/0119895 A1* | 4/2020 | Choi | H04W 76/27 |
| 2020/0137736 A1* | 4/2020 | Du | H04W 76/27 |
| 2020/0145173 A1* | 5/2020 | Lyu | H04L 5/10 |
| 2020/0213984 A1* | 7/2020 | Hwang | H04W 72/0446 |
| 2020/0288463 A1* | 9/2020 | Lee | H04W 72/1242 |
| 2020/0296706 A1* | 9/2020 | Du | H04W 72/0406 |
| 2020/0351887 A1* | 11/2020 | Miao | H04W 76/27 |
| 2020/0389895 A1* | 12/2020 | Shi | H04L 5/0048 |
| 2021/0152312 A1* | 5/2021 | Xiong | H04L 5/0064 |

FOREIGN PATENT DOCUMENTS

| | | |
|---|---|---|
| CN | 107079450 A | 8/2017 |
| WO | 2018175420 A1 | 9/2018 |

OTHER PUBLICATIONS

"Consideration on monitoring preemption indication in bandwidth parts," 3GPP TSG RAN WG1 Meeting AdHoc #3, R1-1715517, Nagoya, Japan, total 2 pages, 3rd Generation Partnership Project (Sep. 18-21, 2017).

"Discussion on the design of DL preemption indication," 3GPP TSG RAN WG1 Meeting #90, R1-1714228, Prague, Czechia, total 2 pages, 3rd Generation Partnership Project (Aug. 21-25, 2017).

"Discussion on the design of DL preemption indication," 3GPP TSG RAN WG1 Meeting NR#3, R1-1716652, Nagoya, Japan, total 3 pages, 3rd Generation Partnership Project (Sep. 18-21, 2017).

Huawei, HiSilicon, "On UL multiplexing of URLLC and eMBB transmissions," 3GPP TSG RAN WG1 Meeting #88bis, Spokane, USA, R1-1704221, total 7 pages, 3rd Generation Partnership Project, Valbonne, France (Apr. 3-7, 2017).

"3rd Generation Partnership Project; Technical Specification Group Radio Access Network; NR; Multiplexing and channel coding (Release 15)," 3GPP TS 38.212 V1.2.1, total 82 pages, 3rd Generation Partnership Project, Valbonne, France (Dec. 2017).

"3rd Generation Partnership Project; Technical Specification Group Radio Access Network; NR; Physical layer procedures for control (Release 15)," 3GPP TS 38.213 V2.0.0, total 56 pages, 3rd Generation Partnership Project, Valbonne, France (Dec. 2017).

"3rd Generation Partnership Project Technical Specification Group Radio Access Network NR Radio Resource Control (RRC) Protocol specification (Release 15)," 3GPP TS 38.331 V1.0.0, total 187 pages, 3rd Generation Partnership Project, Valbonne, France (Dec. 2017).

"Multiplexing of UL transmissions with different data durations and latency requirements," 3GPP TSG RAN WG1 Meeting#90, R1-1712601, Prague, Czech Republic, pp. 1-5, 3rd Generation Partnership Project, Valbonne, France (Aug. 21-25, 2017).

"URLLC DL pre-emption and UL suspension indication channel design," 3GPP TSG-RAN WG1 #91, R1-1720692, Reno, Nevada, US, pp. 1-10, 3rd Generation Partnership Project, Valbonne, France (Nov. 27-Dec. 1, 2017).

* cited by examiner

CONTROL INFORMATION TRANSMISSION METHOD

CROSS-REFERENCE TO RELATED APPLICATIONS

This application is a continuation of International Application No. PCT/CN2018/123629, filed on Dec. 25, 2018, which claims priority to Chinese Patent Application No. 201711490121.9, filed on Dec. 29, 2017. The disclosures of the aforementioned applications are hereby incorporated by reference in their entireties.

TECHNICAL FIELD

Embodiments of the present disclosure relate to the field of wireless communications, and in particular, to a control information transmission method.

BACKGROUND

A 5G mobile communications system supports an enhanced mobile broadband (eMBB) service, an ultra-reliable and low-latency communications (URLLC) service, and a massive machine-type communications (mMTC) service. Typical eMBB services include an ultra-high definition video, augmented reality (AR), virtual reality (VR), or the like. These services are mainly characterized by a large data transmission volume and a very high transmission rate. Typical URLLC services include tactile interactive applications such as wireless control in an industrial manufacturing or production process, motion control of an unmanned vehicle and an unmanned aircraft, remote repair, and remote surgery. These services are mainly characterized by ultra-high reliability, a low latency, a relatively small data transmission volume, and burstiness. Typical mMTC services include smart grid power distribution automation, a smart city, and the like. These services are mainly characterized by a huge quantity of web-connected devices, a relatively small data transmission volume, and insensitivity of data to a transmission latency. mMTC terminals need to satisfy requirements for low costs and a very long standby time.

The URLLC services have a very high requirement on a latency, for example, require a transmission latency to be within 0.5 milliseconds (ms) when reliability is not considered, or require a transmission latency to within 1 ms when 99.999% reliability is reached. Different services have different requirements for a mobile communications system. How to better support data transmission requirements of a plurality of different services is one of technical problems that need to be resolved in a current 5G mobile communications system.

In a long term evolution (LTE) system, a minimum scheduling time unit is a transmission time interval (TTI) having a time length of 1 ms. To meet the transmission latency requirement of the URLLC services, a shorter time scheduling unit may be used for data transmission over a wireless air interface. In the 5G mobile communications system, slot-based scheduling and non-slot-based scheduling may be supported. One slot may include 12 or 14 time domain symbols. The time domain symbols herein may be orthogonal frequency division multiplexing (OFDM) symbols, or may be discrete Fourier transform spread orthogonal frequency division multiplexing (DFTS-OFDM) symbols. When the minimum scheduling time unit is one or more slots, this scheduling is referred to as the slot-based scheduling. When the minimum scheduling time unit is a non-integer quantity of slots, for example, the minimum scheduling time unit is two time domain symbols, this scheduling is referred to as the non-slot-based scheduling.

Because the eMBB service has a relatively large data volume and a relatively high transmission rate, a relatively long scheduling time unit is usually used for data transmission to improve transmission efficiency. For example, one slot with a subcarrier spacing of 15 kHz is used, the slot corresponds to 12 or 14 time domain symbols, and a corresponding time length is 1 ms. To meet an ultra-short latency requirement, URLLC service data usually uses a relatively short scheduling time unit. For example, two time domain symbols with a subcarrier spacing of 15 kHz are used or seven time domain symbols with a subcarrier spacing of 60 kHz are used.

Data packets of the URLLC service are generated abruptly and randomly. No data packet may be generated in a very long period of time, or a plurality of data packets may be generated in a very short period of time. The features of the data packets of the URLLC service affect an allocation manner of transmission resources in a communications system. The transmission resources herein include but are not limited to a time domain symbol, a frequency domain resource, a time frequency resource, a code word resource, a beam resource, and the like. Generally, the transmission resources are allocated by a network device. If the network device allocates a transmission resource to the URLLC service in a resource reservation manner, a reserved transmission resource is wasted when no URLLC service data needs to be transmitted. In addition, the short-latency feature of the URLLC service requires that a data packet be transmitted in an extremely short time. Therefore, the network device needs to reserve sufficient bandwidth for the URLLC service, and consequently transmission resource utilization is greatly reduced.

To improve utilization of uplink transmission resources, a size of a resource reserved for an uplink URLLC service may be appropriately reduced. For URLLC services that can tolerate a specific transmission latency, a grant-based transmission manner is used, that is, a scheduling-based transmission manner is used. However, because the eMBB service uses the slot-based scheduling, when a transmission resource needs to be allocated to the URLLC service, no resource may be available for the URLLC service because the eMBB service is being transmitted. In this case, some or all of allocated time-frequency resources used to transmit eMBB service data may be preempted to transmit the URLLC service data. To stop an eMBB terminal device from sending data on a preempted time-frequency resource in a timely manner, and avoid interference of the eMBB service data to the URLLC service data, the network device needs to send an uplink preemption indication to the terminal device. Correspondingly, to detect the uplink preemption indication in time, the terminal device needs to perform blind detection on the uplink preemption indication in time, and consequently a quantity of times of blind detection performed by the terminal device is increased. However, a maximum quantity of times of blind detection performed by the terminal device on downlink control information is fixed. When the terminal device consumes an excessive quantity of times of blind detection in the uplink preemption indication, a quantity of times of blind detection performed by the terminal device on other downlink control information is affected, and performance of the terminal device is affected.

SUMMARY

This application provides a control information transmission method, to reduce overheads of blind detection performed on an uplink preemption indication by a terminal device or a chip of a terminal device.

A first aspect provides a control information transmission method. An execution body of the method may be a terminal device, or may be a chip or a component used for a terminal device. The method includes: receiving first control information from a network device, where the first control information is used to indicate to send uplink data on a first time-frequency resource; and determining to monitor an uplink preemption indication (PI) based on the first time-frequency resource and a reference uplink resource (RUR), where the uplink PI is used to indicate a third time-frequency resource in the RUR, and the third time-frequency resource is a time-frequency resource in which sending of uplink data is stopped. Preemption may occur only in the RUR. Therefore, when the RUR does not overlap the first time-frequency resource used for uplink data transmission, the terminal device or the chip of the terminal device does not need to monitor the uplink PI. Whether the uplink PI needs to be monitored is determined by determining whether the first time-frequency resource overlaps the RUR, thereby effectively avoiding blind detection performed on the uplink PI by terminal devices or chips of the terminal devices that do not need to receive the uplink PI, and reducing overheads of blind detection performed on the uplink PI by the terminal device or the chip of the terminal device.

In a possible implementation of the first aspect, the determining to monitor an uplink PI based on the first time-frequency resource and an RUR includes: determining to monitor the uplink PI when the first time-frequency resource overlaps the RUR; and determining not to monitor the uplink PI when the first time-frequency resource does not overlap the RUR.

In a possible implementation of the first aspect, the control information transmission method further includes: receiving second control information from the network device, where the second control information is used to indicate to monitor the uplink PI or indicate whether to monitor the uplink PI, and the second control information may be carried by using signaling. The terminal device is semi-statically or dynamically indicated, by using signaling, to monitor the uplink PI, so that terminal devices that need to monitor the uplink PI can be notified, thereby effectively avoiding blind detection performed on the uplink PI by terminal devices that do not need to receive the uplink PI.

In a possible implementation of the first aspect, a frequency domain range of the RUR is a part or all of a frequency domain range of a first bandwidth part (BWP), and the first BWP is a BWP used to transmit the uplink data.

In a possible implementation of the first aspect, the control information transmission method further includes: receiving third control information from the network device, where the third control information is used to indicate at least one of a time domain range, a time domain location, a frequency domain range, a frequency domain location, and a time-frequency location of the RUR. In this implementation, the network device may flexibly configure time domain location information of the RUR.

In a possible implementation of the first aspect, the control information transmission method further includes: receiving fourth control information from the network device, where the fourth control information is used to indicate an occasion for monitoring the uplink PI. In this implementation, the network device may flexibly configure the occasion for monitoring the uplink PI, to effectively control overheads of blind detection performed on the uplink PI by the terminal device or the chip of the terminal device.

In a possible implementation of the first aspect, a time domain range of the RUR is from an $n^{th}$ time domain symbol to an $m^{th}$ time domain symbol after the occasion for monitoring the uplink PI, where n and m are positive integers, n is less than or equal to m, and the time domain symbol herein is a time domain symbol used for uplink data transmission.

In a possible implementation of the first aspect, an occasion for monitoring the uplink PI is located in an $n^{th}$ time domain symbol before an RUR start symbol, where n is a positive integer.

In a possible implementation of the first aspect, the uplink PI is an uplink PI in a neighboring cell. The neighboring cell herein is a neighboring cell of the terminal device, that is, the terminal device can receive a downlink signal of the neighboring cell and/or an uplink signal sent by the terminal device can be received by a network device that manages the neighboring cell. The terminal device receives the uplink PI in the neighboring cell, and determines, based on whether the first time-frequency resource overlaps an RUR of the neighboring cell, whether to stop sending data on a time-frequency resource indicated by the uplink PI in the neighboring cell. In this implementation, interference from uplink data sent by the terminal device to uplink URLLC service data sent by a terminal device in the neighboring cell can be reduced.

A second aspect provides a control information transmission method. An execution body of the method may be a network device, or may be a chip or a component used for a network device. The method is a method corresponding to the first aspect or any possible implementation of the first aspect. Therefore, beneficial effects of the first aspect or any possible implementation of the first aspect can also be implemented. The method includes: generating second control information, where the second control information is used to indicate to monitor an uplink PI, the uplink PI is used to indicate a third time-frequency resource in an RUR, and the third time-frequency resource is a time-frequency resource in which uplink data transmission is stopped; and sending the second control information.

In a possible implementation of the second aspect, a frequency domain range of the RUR is a part or all of a frequency domain range of a first BWP, and the first BWP is a BWP used to transmit the uplink data.

In a possible implementation of the second aspect, the method further includes: sending third control information, where the third control information is used to indicate at least one of a time domain range, a time domain location, a frequency domain range, a frequency domain location, and a time-frequency location of the RUR.

In a possible implementation of the second aspect, the method further includes: sending fourth control information, where the fourth control information is used to indicate an occasion for monitoring the uplink PI.

In a possible implementation of the first aspect, a time domain range of the RUR is from an $n^{th}$ time domain symbol to an $m^{th}$ time domain symbol after the occasion for monitoring the uplink PI, where n and m are positive integers, n is less than or equal to m, and the time domain symbol is a time domain symbol used for uplink data transmission.

In a possible implementation of the first aspect, an occasion for monitoring the uplink PI is located in an $n^{th}$ time domain symbol before an RUR start symbol, where n is a positive integer.

A third aspect provides a communications apparatus. The communications apparatus is configured to perform units, modules, or circuits in the method according to the first aspect or any possible implementation of the first aspect.

A fourth aspect provides a communications apparatus. The communications apparatus is configured to perform units, modules, or circuits in the method according to the second aspect or any possible implementation of the second aspect.

A fifth aspect provides a communications apparatus. The communications apparatus includes a processor, and optionally, may further include a memory. The memory may be configured to store a computer program or an instruction, or may be configured to store intermediate data processed by the processor. The processor may be configured to execute the computer program or the instruction stored in the memory, or may be configured to execute a computer program or an instruction stored or fixed in the processor. When executing the computer program or the instruction, the processor is configured to perform the method according to the first aspect or any possible implementation of the first aspect, or is configured to perform the method according to the second aspect or any possible implementation of the second aspect. The processor and the memory communicate with each other by using an internal connection path.

A sixth aspect provides a computer-readable storage medium. The computer-readable storage medium is configured to store a computer program or an instruction. When the computer program or the instruction is run on a computer, the computer performs the method according to the first aspect or any possible implementation of the first aspect, or performs the method according to the second aspect or any possible implementation of the second aspect.

A seventh aspect provides a computer program product. When the computer program product is run on a computer, the computer performs the method according to the first aspect or any possible implementation of the first aspect, or performs the method according to the second aspect or any possible implementation of the second aspect.

DESCRIPTION OF EMBODIMENTS

The following describes the technical solutions in the embodiments of the present disclosure with reference to the accompanying drawings in the embodiments of the present disclosure.

Figure 1:
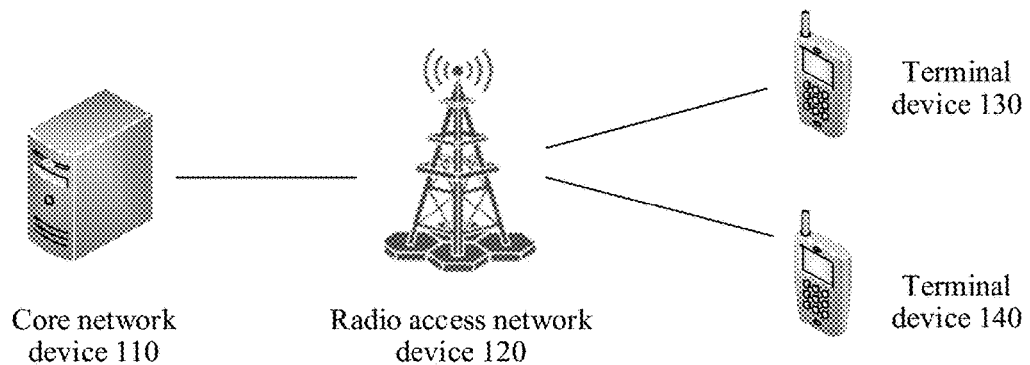
FIG. 1 is a schematic architectural diagram of a mobile communications system to which an embodiment of this application is applied.

FIG. 1 is a schematic architectural diagram of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different independent physical devices, or functions of the core network device and logical functions of the radio access network device may be integrated into a same physical device, or some functions of the core network device and some functions of the radio access network device may be integrated into a physical device. The terminal device may be at a fixed location or may be mobile. FIG. 1 is merely a schematic diagram. The communications system may further include other network devices, for example, may further include a wireless relay device and a wireless backhaul device, which are not drawn in FIG. 1. Quantities of core network devices, radio access network devices and terminal devices included in the mobile communications system are not limited in the embodiments of this application.

The radio access network device is an access device that is connected to the mobile communications system via the terminal device in a wireless manner. The radio access network device may be a base station NodeB, an evolved base station eNodeB, a base station in a 5G mobile communications system or a new radio (NR) communications system, a base station in a future mobile communications system, an access node in a Wi-Fi system, or the like. A specific technology used by the radio access network device and a specific device form are not limited in the embodiments of this application. In this application, the radio access network device is briefly referred to as a network device. Unless otherwise specified, in this application, all network devices are radio access network devices. In this application, the terms 5G and NR may be equivalent.

The terminal device may also be referred to as a terminal, a user equipment (UE), a mobile station (MS), a mobile terminal (MT), or the like. The terminal device may be a mobile phone, a tablet (Pad), a computer having a wireless transceiver function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, and the like.

The radio access network device and the terminal device may be deployed on land, including an indoor or outdoor device, a handheld device, or a vehicle-mounted device. It can also be deployed on water or on aircraft, balloons, and satellites in the air. An application scenario of the radio access network device and the terminal device is not limited in the embodiments of this application.

Communication between the radio access network device and the terminal device and communication between terminal devices may be performed by using a licensed spectrum, or an unlicensed spectrum, or both a licensed spectrum and an unlicensed spectrum. Communication between the radio access network device and the terminal device and communication between the terminal devices may be performed by using a spectrum below 6 gigahertz (GHz), or a spectrum above 6 GHz, or both a spectrum below 6 GHz and a spectrum above 6 GHz. A spectrum resource used between the radio access network device and the terminal device is not limited in the embodiments of this application.

Embodiment 1: Single-Cell Scenario

Due to burstiness of data of a URLLC service, to improve system resource utilization, a network device usually does not reserve a resource for downlink data transmission of the URLLC service. When the URLLC service data arrives at the network device, if there is no idle time-frequency resource currently, to meet an ultra-short latency requirement of the URLLC service, the network device cannot wait for scheduling the URLLC service data until transmission of eMBB service data scheduled currently is complete. The network device may allocate a resource to the URLLC service data in a preemption manner. The preemption herein means that the network device selects some or all of allocated time-frequency resources used to transmit the eMBB service data to transmit the URLLC service data, and the network device does not send the eMBB service data on a time-frequency resource used to transmit the URLLC service data.

When downlink URLLC service data preempts a transmission resource of downlink eMBB service data, transmission quality of the eMBB service data is severely affected. To reduce impact of preemption on the transmission quality of the eMBB service data, the network device may send a preemption indication (PI) to a eMBB terminal device, to notify the eMBB terminal device of a location of the preempted resource. To simplify a design of the preemption indication, a reference downlink resource (RDR) is defined, and a downlink preemption indication indicates that some or all of time-frequency resources in the RDR are preempted. The eMBB terminal device whose transmission resource is preempted may clear data on the preempted resource from a buffer, to prevent the data from participating in decoding and HARQ combination, thereby improving transmission performance of the eMBB service data.

There may be two transmission manners for uplink URLLC service data. The first transmission manner is a grant-free (GF) transmission manner. To be specific, a system predefines some GF resources; when the terminal device needs to transmit URLLC service data to the network device, the terminal device transmits the URLLC service data to the network device by using the GF resources. The second transmission manner is a grant-based (GB) transmission manner. To be specific, when the terminal device needs to transmit URLLC service data to the network device, the terminal device sends a scheduling request (SR) to the network device, and then the network device allocates an uplink transmission resource to the terminal device. The terminal device transmits the URLLC service data to the network device by using the uplink transmission resource allocated by the network device. A transmission latency can be reduced when the URLLC service data is transmitted in the GF transmission manner. However, because the GF resources need to be reserved, transmission efficiency is lower than that of the GB transmission manner. For some specific URLLC service data, if a specific transmission latency can be tolerated, the specific URLLC service data can use the GB transmission manner, to improve transmission efficiency.

When the network device receives an SR sent by a URLLC terminal device, if currently no idle transmission resource is available for the URLLC terminal device, for example, all transmission resources are allocated to the eMBB terminal device, the network device may allocate some transmission resources that have been allocated to the eMBB terminal device to the URLLC terminal device to transmit the URLLC service data, thereby reducing a waiting latency of the URLLC service data. In this application, the URLLC terminal device is a terminal device that needs to transmit URLLC service data to the network device, and the eMBB terminal device is a terminal device that needs to transmit eMBB service data to the network device. The URLLC terminal device and the eMBB terminal device may be a same terminal device, or may be different terminal devices. When a terminal device needs to transmit both URLLC service data and eMBB service data to the network device, the terminal device may be referred to as a URLLC terminal device and also an eMBB terminal device.

Figure 2:
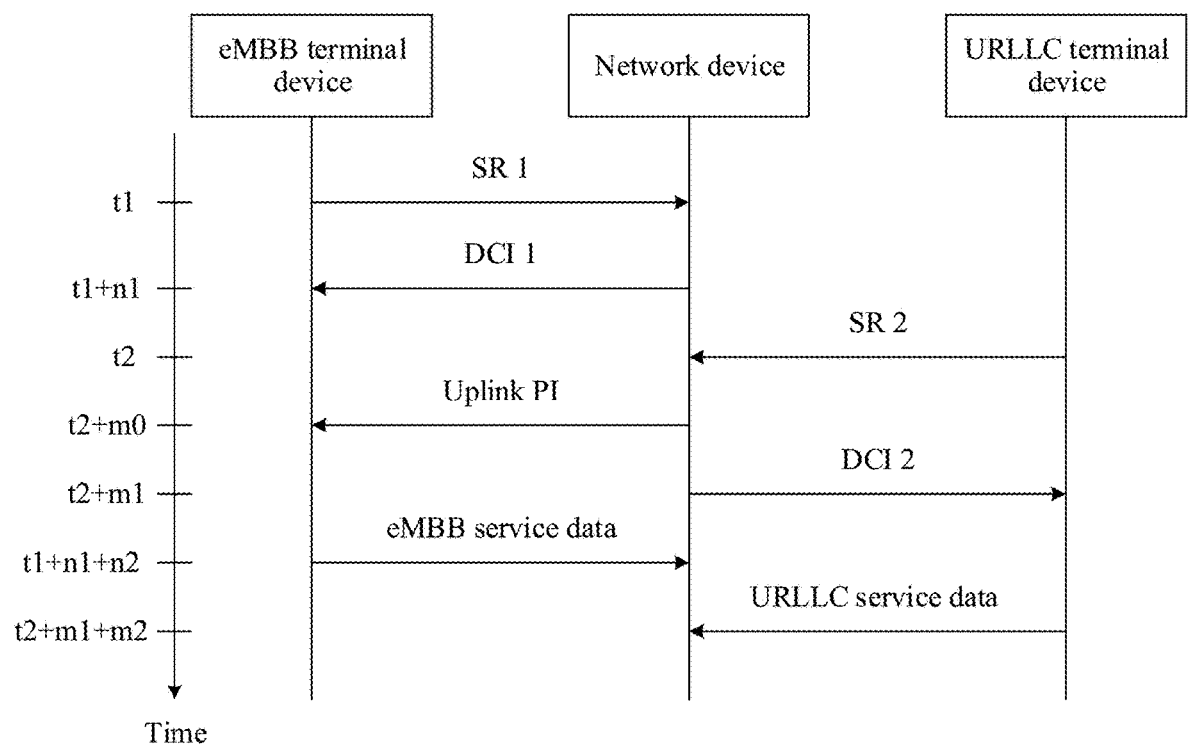
FIG. 2 is a schematic flowchart of preempting, by uplink URLLC service data, a time-frequency resource used to transmit eMBB service data.

As shown in FIG. 2, after receiving an SR 1 sent by the eMBB terminal device at a moment t1, the network device allocates an uplink time-frequency resource A to the eMBB terminal device at a moment t1+n1 by using downlink control information (DCI). DCI sent to the eMBB terminal device is denoted as DCI 1. After receiving the DCI 1 sent by the network device, the eMBB terminal device sends eMBB service data to the network device at a moment t1+n1+n2. Generally, a minimum scheduling time unit of the eMBB service data is one slot. When the network device receives an SR 2 sent by the URLLC terminal device at a moment t2, and finds that there is no available transmission resource, the network device sends an uplink PI to the eMBB terminal device at a moment t2+m0, to indicate that an uplink time-frequency resource B is preempted by the URLLC terminal device and is used to transmit URLLC service data. The uplink time-frequency resource B may be a part or all of the uplink time-frequency resource A, or the uplink time-frequency resource B may overlap the uplink time-frequency resource A. In this application, overlapping includes complete overlapping and partial overlapping. After receiving the uplink PI, the eMBB terminal device stops sending data on a time-frequency resource C that is an overlapping part of the time-frequency resource B and the time-frequency resource A, to avoid that both the eMBB service data and the URLLC service data are sent on the same time-frequency resource C and severe interference is generated between each other. The network device sends DCI 2 to the URLLC terminal device at a moment t2+m1, and allocates a time-frequency resource D to transmit the URLLC service data. The uplink time-frequency resource D may be a part or all of the uplink time-frequency resource B, or the time-frequency resource D may overlap the time-frequency resource B. After receiving the DCI 2 sent by the network device, the URLLC terminal device sends the URLLC service data to the network device at a moment t2+m1+m2. t1, t2, n1, n2, m0, m1, and m2 are all positive real numbers, t1 is less than t2, and whether m0 is greater than m1 is not limited, that is, m0 may be equal to m1, or may be less than m1, or may be greater than m1. t1+n1+n2 is less than or equal to t2+m1+m2, and whether t1+n1 is greater than t2 and whether t1+n1 is greater than t2+m0 are not limited.

The uplink PI may be sent to a terminal device whose resource is preempted, or may be sent to a group of terminal devices, or may be sent to all terminal devices in a cell. The uplink PI may be used as downlink control information (DCI) in a specific format, or may be used as a field in DCI in a format. The DCI is carried on a physical downlink control channel (PDCCH), and is sent by the network device to the terminal device.

To determine whether the network device sends DCI in a format to the terminal device, the terminal device needs to perform blind detection (BD) on the DCI on a time-frequency resource that may appear on the PDCCH at a moment corresponding to a monitoring occasion of the DCI. Whether blind detection on DCI succeeds is usually determined by whether a cyclic redundancy check (CRC) succeeds. When the CRC succeeds, it indicates that the DCI is sent to the terminal device. When the CRC fails, the network device may not send the DCI, or the DCI sent by the network device should not be sent to the terminal device, or received signal quality of the PDCCH is too poor, and consequently information carried on the PDCCH cannot be decoded successfully. In this application, "monitor" and "detect" are not strictly distinguished, and may be interchanged with each other.

The eMBB terminal device determines data transmission behavior based on the uplink PI. For example, the eMBB terminal device may stop sending of uplink data on a time-frequency resource indicated by the uplink PI, or may suspend or delay the sending of the uplink data on the time-frequency resource indicated by the uplink PI, or may change a transmission parameter of the uplink data on the time-frequency resource indicated by the uplink PI. The transmission parameter herein may include at least one of transmit power of data, a modulation and coding scheme, and data mapping. Therefore, the uplink PI needs to be sent in a timely manner to the eMBB terminal device whose resource is preempted. Correspondingly, the eMBB terminal device also needs to perform, in a timely manner, blind detection on the DCI that carries the uplink PI. To notify the eMBB terminal device of preemption information in a more timely manner by using the uplink PI, a detection occasion of the DCI that carries the uplink PI may be defined as detection performed once on each time domain symbol. In other words, the DCI that carries the uplink PI may appear on any time domain symbol. However, this brings two problems. One is that the eMBB terminal device needs to perform, on each time domain symbol, blind detection on the DCI that carries the uplink PI. This consumes a large quantity of blind detection resources, and consequently the eMBB terminal device does not have sufficient resources to perform blind detection on DCI in another format. Another problem is that an increase in a quantity of times of blind detection performed by the eMBB terminal device causes an increase in power consumption of the eMBB terminal device.

The control information transmission method provided in this embodiment of this application relates to sending, by a second communications apparatus, control information to a first communications apparatus, to reduce a quantity of times of blind detection performed by the first communications apparatus on the control information. The first communications apparatus may be a terminal device, or may be a chip or a component that can be used by a terminal device. The second communications apparatus may be a network device, or may be a chip or a component that can be used by a network device. The control information transmission method is applicable to a scenario in which second service data preempts a transmission resource already allocated to first service data during uplink data transmission. The first service data and the second service data may be two different types of service data from a same terminal device or two different terminal devices. For example, the first service data and the second service data may be two different types of service data, or may be service data of a same type but with different quality of service (QoS) requirements. This is not limited in this embodiment of this application.

For ease of understanding and description, in the embodiments of this application, an example in which the first service data is eMBB service data, the second service data is URLLC service data, the first communications apparatus is a terminal device, and the second communications apparatus is a network device is used for description. The first service data may also be mMTC service data. Specific types of the first service data and the second service data are not limited in this application. Specific names of the first communications apparatus and the second communications apparatus are not limited in this application either. It may be understood that the first service data may be carried on a first data channel, and the second service data may be carried on a second data channel. In this case, a first time-frequency resource used to transmit the first service data may be understood as a first time-frequency resource on the first data channel, and a second time-frequency resource allocated to the second service data may be understood as a second time-frequency resource allocated to the second data channel. Preempting, by the first service data, a time-frequency resource of the second service data may be understood as preempting, by the first data channel, a time-frequency resource of the second data channel.

Corresponding to the RDR, to simplify a design of the uplink PI, a reference uplink resource (RUR) may be defined. The uplink PI is used to indicate third time-frequency resource information in the RUR. The third time-frequency resource information may be information about a time-frequency resource in which uplink data transmission is stopped, or may be information about time when sending of the uplink data is stopped, or may be information about a time-frequency resource in which a transmission parameter is changed. The time information may be location information of a time domain symbol on which sending of the uplink data is stopped, or may be location information of a start time domain symbol on which sending of the uplink data is stopped. The transmission parameter may include at least one of transmit power of data, a modulation and coding scheme, and data mapping. The RUR may also be understood as an uplink time-frequency resource that may be preempted, and a corresponding third time-frequency resource is an uplink time-frequency resource on which resource preemption has occurred. The third time-frequency resource may be consecutive or discrete in time domain, and may be consecutive or discrete in frequency domain. When the uplink PI is used to indicate a preempted time-frequency resource in the RUR, because an indication granularity of the uplink PI may be inconsistent with that of actual preempted time-frequency resources, only some of the time-frequency resources indicated by the uplink PI may be preempted. For example, the indication granularity of the uplink PI is six resource blocks (RB), but actually, time-frequency resources of only two RBs are preempted. In this application, stopping sending uplink data may also be understood as that a resource used to send the uplink data is reconfigured. For example, after the third time-frequency resource is reconfigured, the third time-frequency resource is no longer used to send the uplink data.

The uplink PI may be used to indicate a time-frequency resource that is affected in the RUR and that is in uplink data transmission of the terminal device, to indicate the terminal device to stop sending uplink data in a timely manner on the third time-frequency resource indicated by the uplink PI, or to indicate the terminal device to adjust the transmission parameter on the third time-frequency resource indicated by the uplink PI. The affected time-frequency resource in uplink data transmission herein includes the foregoing time-frequency resource preempted by other service data, or may include a reserved resource, or may be a time-frequency resource on which the terminal device is expected to stop sending uplink data or adjust a transmission parameter in any other scenario. In this embodiment of this application, an example in which the uplink PI is used to indicate the preempted time-frequency resource in the RUR is used. However, this is not limited in this application.

Figure 3:
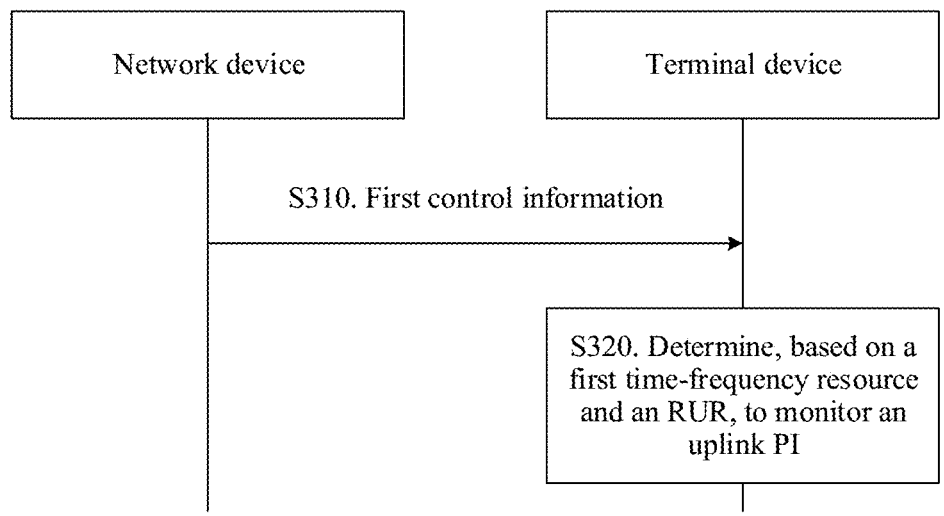
FIG. 3 is a schematic diagram of a control information transmission method according to an embodiment of this application.

As shown in FIG. 3, this application provides a control information transmission method, to reduce blind detection performed by the terminal device on the uplink PI.

S310. The network device sends first control information to the terminal device. Correspondingly, the terminal device receives the first control information from the network device. The first control information is used to indicate the terminal device to send uplink data on a first time-frequency resource.

S320. The terminal device may determine, based on the first time-frequency resource and the RUR, to monitor the uplink PI or determine not to monitor the uplink PI.

Figure 4:
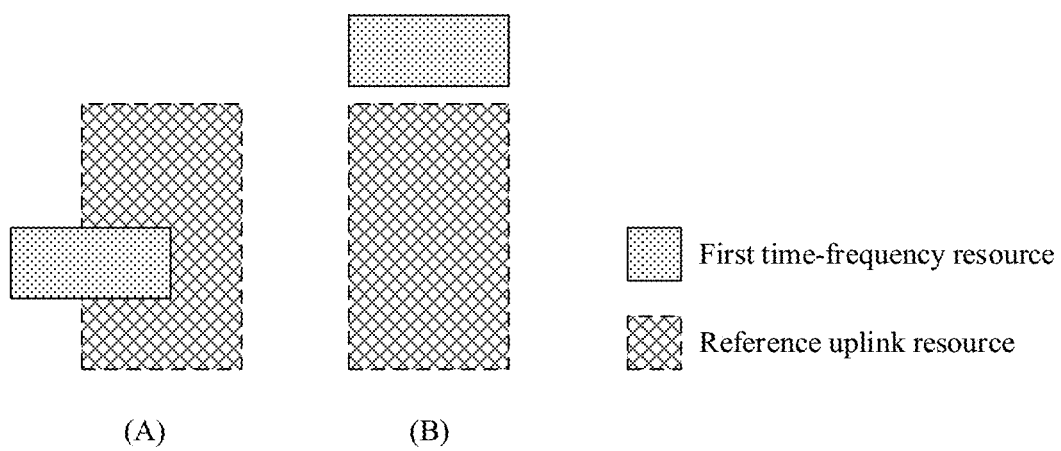
FIG. 4 is a schematic diagram of a relationship between a first time-frequency resource and a reference uplink resource.

Specifically, the first time-frequency resource may be a time-frequency resource that is allocated by the network device to the terminal device and that is used to transmit eMBB service data. As shown in (A) in FIG. 4, when the first time-frequency resource overlaps the RUR, it is referred to as that a condition 1 is met, and the terminal device determines to monitor the uplink PI. It may be understood that the condition 1 herein means whether the first time-frequency resource overlaps the RUR. As shown in (B) in FIG. 4, when the first time-frequency resource does not overlap the RUR, that is, the condition 1 is not met, the terminal device determines not to monitor the uplink PI. Because uplink preemption occurs only in the RUR, when the condition 1 is not met, the terminal device does not need to monitor the uplink PI. Whether the uplink PI is monitored is determined by determining whether the first time-frequency resource overlaps the RUR, thereby effectively avoiding blind detection performed on the uplink PI by terminal devices that do not need to receive the uplink PI.

It may be understood that if the terminal device is not scheduled, that is, when the terminal device does not transmit uplink data, the terminal device does not need to monitor the uplink PI. When preemption of an uplink feedback is allowed, the uplink feedback may be used as special uplink data transmission, and is processed the same as uplink data transmission. The uplink feedback herein includes an acknowledgment (ACK) and a negative acknowledgment (NACK) of a hybrid automatic repeat request (HARQ), and may also include a channel state information (CSI) feedback.

Figure 5:
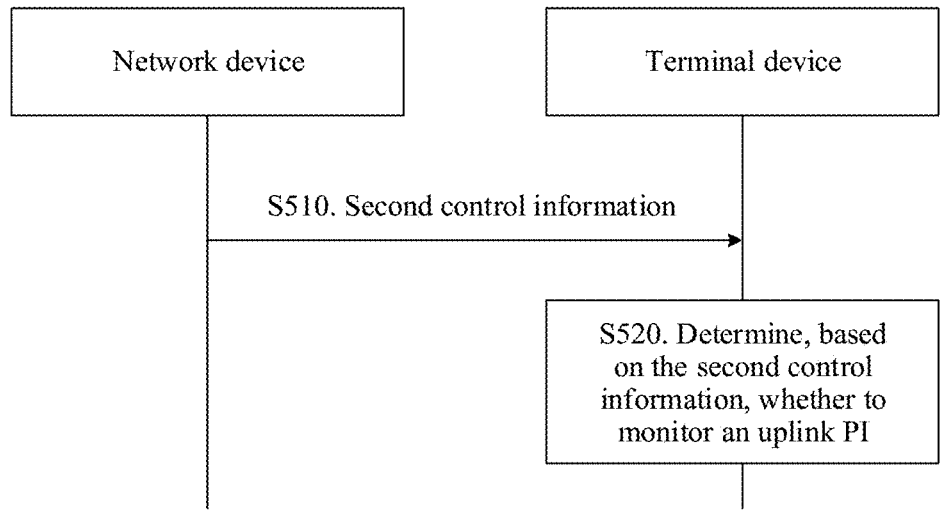
FIG. 5 is a schematic diagram of another control information transmission method according to an embodiment of this application.

As shown in FIG. 5, this application further provides another control information transmission method, to reduce blind detection performed by the terminal device on the uplink PI.

S510. The network device sends second control information to the terminal device. Correspondingly, the terminal device receives the second control information from the network device. The second control information is used to indicate the terminal device to monitor the uplink PI or indicate whether the terminal device monitors the uplink PI, and the second control information may be carried by using signaling.

In this application, the signaling may be radio resource control (RRC) signaling, or may be physical layer signaling, or may be medium access control signaling. The signaling may be signaling sent to a specific terminal device, or may be group signaling, that is, the signaling is sent to a group of terminal devices, or may be broadcast signaling, that is, the signaling is sent to all terminal devices in a cell. The physical layer signaling herein may be DCI, for example, DCI that is sent to the eMBB terminal device and that is used to schedule uplink data transmission. To be specific, when the eMBB terminal device is scheduled to perform uplink data transmission, the physical layer signaling indicates whether the eMBB terminal device needs to monitor the uplink PI.

S520. The terminal device determines, based on the second control information, to monitor the uplink PI or determine not to monitor the uplink PI.

Specifically, the second control information may have a value, for example, a first value used to indicate the terminal device to monitor the uplink PI. Alternatively, the second control information may have two values, for example, a first value used to indicate the terminal device to monitor the uplink PI, and a second value used to indicate the terminal device not to monitor the uplink PI. Herein, the first value may be 1 and the second value may be 0, or the first value is 0 and the second value is 1. When the terminal device receives the second control information or when the value of the received second control information is the first value, it is referred to as that a condition 2 is met. The condition 2 herein means whether the terminal device receives the second control information or whether the value of the second control information received by the terminal device is the first value. It may be understood that the condition 2 may be used independently. To be specific, provided that the condition 2 is met, the terminal device monitors the uplink PI at a moment corresponding to a monitoring occasion of the uplink PI. When the condition 2 is not met, that is, the terminal device does not receive the second control information or the received value of the second control information is not the first value, the terminal device does not monitor the uplink PI. The condition 2 may also be used in combination with another condition in this embodiment of this application. For example, when the condition 2 is met and the condition 1 is further met, the terminal device monitors the uplink PI at the moment corresponding to the monitoring occasion of the uplink PI. When either condition 1 or condition 2 is not met, the terminal device does not monitor the uplink PI.

Optionally, the second control information and the first control information may be carried in same DCI. In other words, the second control information is carried in DCI for scheduling uplink data.

In this embodiment of this application, the terminal device is semi-statically or dynamically indicated, by using the signaling, to monitor the uplink PI, so that terminal devices that need to monitor the uplink PI can be notified, thereby effectively avoiding blind detection performed on the uplink PI by terminal devices that do not need to receive the uplink PI.

Figure 6:
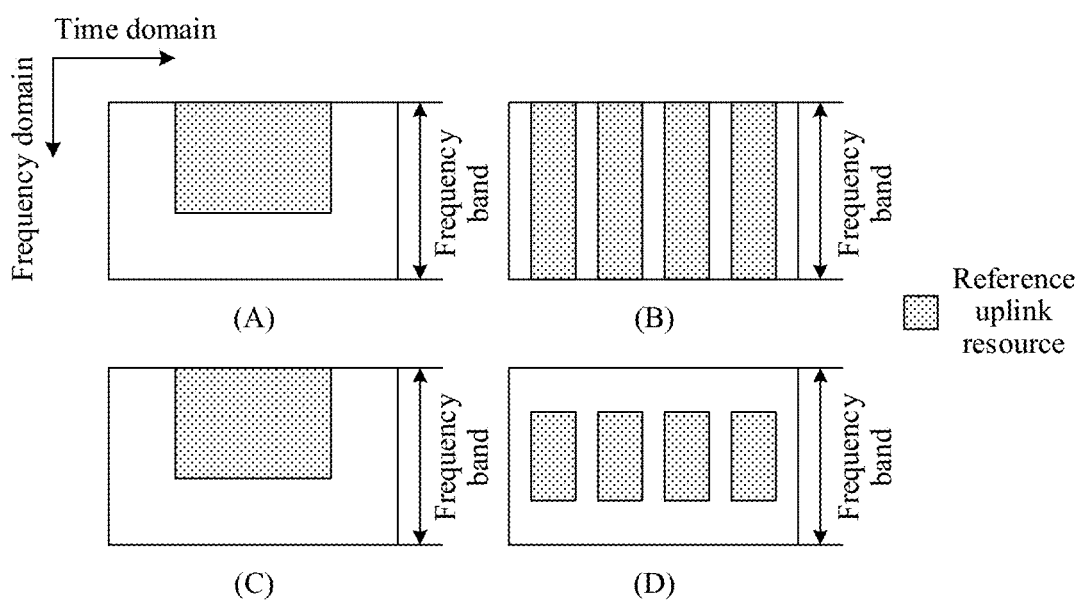
FIG. 6 is a schematic diagram of a time-frequency location of a reference uplink resource according to an embodiment of this application.

A time-frequency location of the RUR is not limited in this application. The RUR may be consecutive in the time-frequency location, as shown in (A) and (C) in FIG. 6. The RUR may also be discrete in the time-frequency location, as shown in (B) and (D) in FIG. 6. For example, the RUR may be a part of a frequency band in frequency domain, as shown in (A), (C), and (D) in FIG. 6. The RUR may also cross an entire frequency band in frequency domain, as shown in (B) in FIG. 6. The RUR may be consecutive in frequency domain as shown in FIG. 6. The RUR may also be discrete in frequency domain, which is not shown in FIG. 6. The RUR may be consecutive or discrete in time domain. The frequency band herein may be a sub-band or an uplink BWP.

Specifically, a frequency domain range of the RUR in this embodiment of this application may be all of a frequency domain range of a first bandwidth part (BWP). The first BWP herein is a BWP used to transmit uplink data. A plurality of terminal devices that activate a same BWP may form one group of terminal devices. For the group of terminal devices, the network device sends a same group common uplink PI. The group common uplink PI may be scrambled by using a group common radio network temporary identifier (RNTI). The terminal device may monitor only an uplink PI corresponding to the first BWP. Alternatively, the uplink PI may not be distinguished by using the RNTI, but different search spaces are configured for different groups of terminal devices. Each search space corresponds to one uplink PI and one RUR. In this case, the terminal device determines the group based on the configured search space, or determines the search space based on the group. A group to which a terminal device belongs may be indicated by using the signaling.

The frequency domain range of the RUR in this embodiment of this application may also be a part of the frequency domain range of the first BWP.

The following describes a relationship between the uplink PI and the RUR. The uplink PI and the RUR may be in a one-to-one relationship, a one-to-many relationship, or a many-to-one relationship. In this application, the relationship between the uplink PI and the RUR may also be understood as a relationship between the monitoring occasion of the uplink PI and the RUR or a relationship between the search space and the RUR. Therefore, when the relationship between the uplink PI and the RUR is involved, the uplink PI, a time domain location of the uplink PI, and the monitoring occasion of the uplink PI or the search space may be interchanged. An RUR corresponding to a monitoring occasion of an uplink PI may be referred to as one RUR, and a time-frequency location of the RUR may be consecutive or discrete, as shown in FIG. 6.

Figure 7:
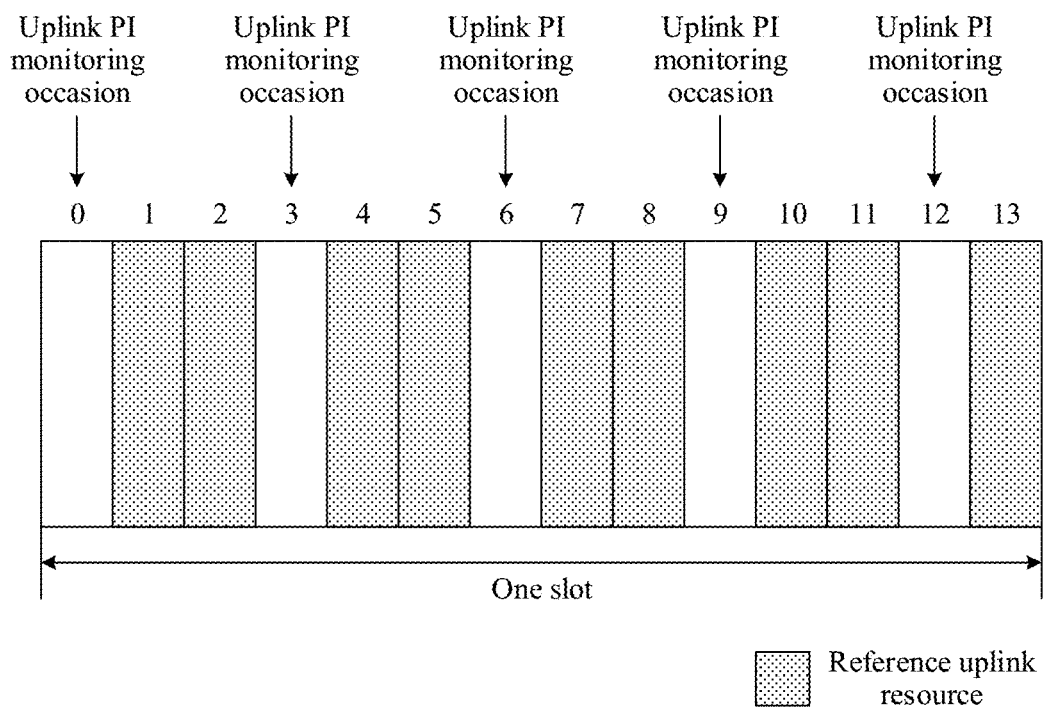
FIG. 7 is a schematic diagram of a location relationship between an uplink PI monitoring occasion and a reference uplink resource according to an embodiment of this application.

In a possible design, the RUR is divided into a plurality of RURs by a plurality of monitoring occasions of the uplink PI in one time unit. The one time unit herein may be one or more slots. Optionally, one uplink PI is in a one-to-one correspondence with one RUR, and each uplink PI is sent on a symbol preceding an RUR corresponding to the uplink PI. The monitoring occasions of the uplink PIs are on discontinuous symbols. One slot is used as an example. As shown in FIG. 7, it is assumed that the monitoring occasions of the uplink PIs are located in a symbol 0, a symbol 3, a symbol 6, a symbol 9, and a symbol 12 in the slot. Correspondingly, there are five RURs in the slot, and the first RUR is located in a symbol 1 and a symbol 2; the second RUR is located in a symbol 4 and a symbol 5; the third RUR is located in a symbol 7 and a symbol 8; the fourth RUR is located in a symbol 10 and a symbol 11; and the fifth RUR is located in a symbol 13.

In another possible implementation, the monitoring occasions of the uplink PIs are located in a symbol 0, a symbol 3, a symbol 6, and a symbol 9. Correspondingly, the first RUR is located in a symbol 1 and a symbol 2; the second RUR is located in a symbol 4 and a symbol 5; the third RUR is located in a symbol 7 and a symbol 8; and the fourth RUR is located in a symbol 10, a symbol 11, a symbol 12, and a symbol 13.

In still another possible implementation, the monitoring occasions of the uplink PIs are located in a symbol 3, a symbol 6, a symbol 9, and a symbol 12 in one slot. Correspondingly, the first RUR is located in a symbol 4 and a symbol 5; the second RUR is located in a symbol 7 and a symbol 8; the third RUR is located in a symbol 10 and a symbol 11; and the fourth RUR is located in a symbol 13.

In still another possible implementation, the monitoring occasions of the uplink PIs are located in a symbol 3, a symbol 6, and a symbol 9 in one slot. Correspondingly, the first RUR is located in a symbol 4 and a symbol 5; the second RUR is located in a symbol 7 and a symbol 8; and the third RUR is located in a symbol 10, a symbol 11, a symbol 12, and a symbol 13.

In this application, symbols in one slot may be numbered from 1, or may be numbered from 0. This is not limited in this application.

It should be noted that, in this application, unless otherwise specified, a symbol is a time domain symbol, an OFDM symbol, or a DFTS-OFDM symbol. In the foregoing design, the terminal device needs to monitor the uplink PI only on a time domain symbol that is discrete in time domain and that corresponds to the uplink PI monitoring occasion. Therefore, overheads of blind detection performed on the uplink PI by the terminal device can be effectively reduced. In addition, because a time domain range of an RUR corresponding to one uplink PI is very narrow, and there are only one or two time domain symbols, a quantity of bits that are required by the corresponding uplink PI and that are used to indicate a preempted resource may be relatively small. This helps improve reliability and transmission efficiency of the uplink PI.

Figure 8:
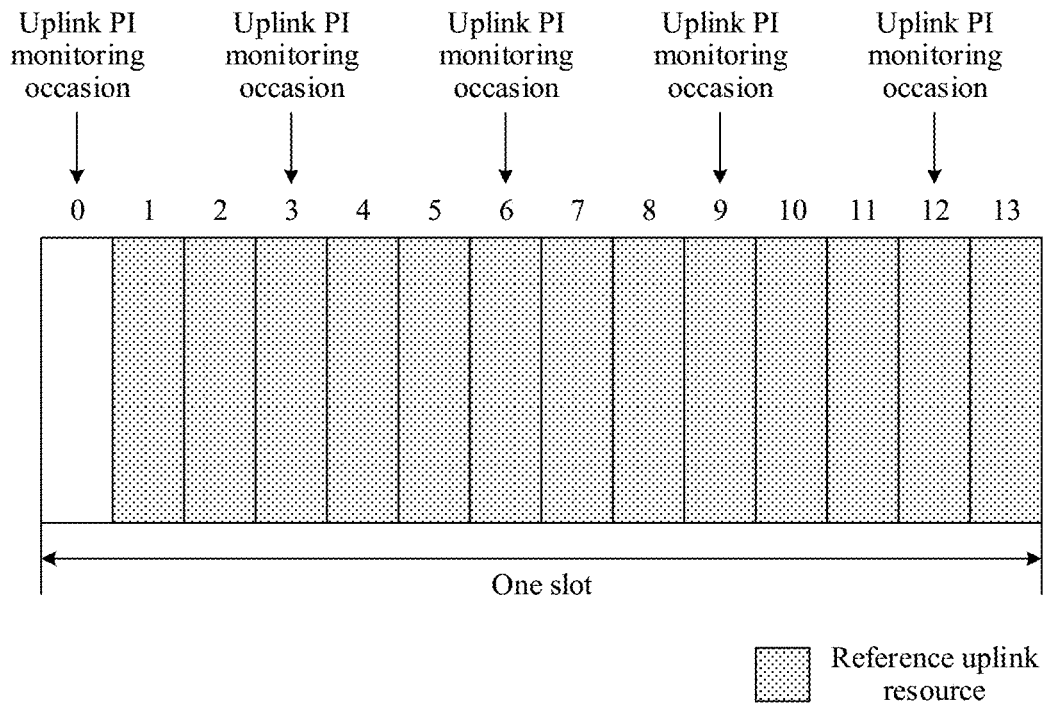
FIG. 8 is a schematic diagram of another location relationship between an uplink PI monitoring occasion and a reference uplink resource according to an embodiment of this application.

In still another possible design, as shown in FIG. 8, different RURs overlap on a time-frequency resource. For example, the monitoring occasions of the uplink PI are the same as that in FIG. 7, but a time domain location of the RURs is from a symbol that is after a monitoring occasion of a corresponding uplink PI to the end of the slot.

This application further provides a method for determining a time-frequency location of an RUR. The time-frequency location of the RUR may be predefined in a protocol. For example, the protocol predefines a time domain symbol in which the RUR is located, and a frequency domain range of the RUR is a BWP. The method in which the protocol predefines the time-frequency location of the RUR may reduce signaling overheads. Alternatively, the time-frequency location of the RUR may be notified to the terminal device by using the signaling after being determined by the network device. The signaling may notify a specific time-frequency location of the RUR, or may predefine several configurations, and the signaling notification carries only an index or a number of the RUR configurations. The time-frequency location of the RUR is dynamically or semi-statically configured by using the signaling, so that scheduling of the network device is more flexible, and resource utilization is higher. The time-frequency location of the RUR includes a time domain location and a frequency domain location. For an RUR that is consecutive in time domain, a time domain location of the RUR may be alternatively represented by using a time domain range. For an RUR that is consecutive in frequency domain, a frequency domain location of the RUR may be represented by using a frequency domain range.

The time-frequency location of the RUR may be further determined in the following methods: The time domain location of the RUR is predefined in the protocol, and the frequency domain location of the RUR is notified by the network device to the terminal device by using the signaling; alternatively, the frequency domain location of the RUR is predefined in the protocol, and the time domain location of the RUR is notified by the network device to the terminal device by using the signaling; alternatively, the frequency domain location of the RUR is predefined in the protocol, and the time domain location of the RUR is determined based on a monitoring occasion of an uplink PI of the RUR. For example, the time domain range of the RUR is from an $n^{th}$ time domain symbol to an $m^{th}$ time domain symbol after an occasion for monitoring the uplink PI, where n and m are positive integers, and n is less than or equal to m. The time domain symbol herein is a time domain symbol used for uplink data transmission. Alternatively, the time domain range of the RUR is between a first occasion for monitoring the uplink PI and a second occasion for monitoring the uplink PI, where the first occasion is adjacent to the second occasion, and a time domain start location of the first occasion is earlier than a time domain start location of the second occasion.

The time domain location of the RUR predefined in the protocol may be, for example, a slot, or the foregoing time domain location of the RUR. The frequency domain location of the RUR predefined in the protocol may be one sub-band or one BWP.

To determine the time-frequency location of the RUR, the network device may send third control information to the terminal device by using the signaling. Correspondingly, the terminal device receives the third control information from the network device. The third control information is used to indicate at least one of the time domain range, the time domain location, the frequency domain range, the frequency domain location, and the time-frequency location of the RUR.

This application further provides a method for determining an uplink PI monitoring occasion. The monitoring occasion of the uplink PI may be predefined in the protocol, or may be notified to the terminal device by using the signaling after being determined by the network device. A specific monitoring occasion of the uplink PI may be notified by using the signaling. Alternatively, several configurations may be defined, and then an index or a number of the configurations of the monitoring occasion of the uplink PI is notified by using the signaling. As shown in Table 1, Table 2, Table 3, and Table 4, three configurations of the uplink PI monitoring occasion are defined. The plurality of configurations of the monitoring occasion herein may be predefined in the protocol, or may be determined by the network device and then sent to the terminal device by using the RRC signaling. The plurality of monitoring occasion configurations are defined, and different monitoring occasions are allocated to different terminal devices. For a single terminal device, a monitoring occasion is discrete in one slot. Therefore, a quantity of times of blind detection performed by the terminal device on the uplink PI can be effectively reduced. On the other hand, there are terminal devices with all kinds of monitoring occasions in a cell, correspondingly, there is an RUR on each time domain symbol. When URLLC service data needs to be transmitted, a time-frequency resource can be preempted in time for transmitting the URLLC service data.

TABLE 1

| Configuration index | Uplink PI monitoring occasion (number of a symbol in a slot) |
|---|---|
| 0 | 0, 3, 6, 9, 12 |
| 1 | 1, 4, 7, 10, 13 |
| 2 | 2, 5, 8, 11 |

TABLE 2

| Configuration index | Uplink PI monitoring occasion (number of a symbol in a slot) |
|---|---|
| 0 | 0, 3, 6, 9 |
| 1 | 1, 4, 7, 10 |
| 2 | 2, 5, 8, 11 |

TABLE 3

| Configuration index | Uplink PI monitoring occasion (number of a symbol in a slot) |
|---|---|
| 0 | 3, 6, 9, 12 |
| 1 | 4, 7, 10, 13 |
| 2 | 5, 8, 11 |

TABLE 4

| Configuration index | Uplink PI monitoring occasion (number of a symbol in a slot) |
|---|---|
| 0 | 3, 6, 9 |
| 1 | 4, 7, 10 |
| 2 | 5, 8, 11 |

To determine the monitoring occasion of the uplink PI, the network device may send fourth control information to the terminal device by using the signaling. Correspondingly, the terminal device receives the fourth control information from the network device, where the fourth control information is used to indicate the occasion for monitoring the uplink PI by the terminal device. Specifically, the fourth control information may indicate a specific location of the monitoring occasion. For example, a bitmap is used to indicate time domain symbols on which the uplink PI needs to be monitored in one slot. The fourth control information may further indicate an index or a number of a configuration of the monitoring occasion. The terminal device may determine the monitoring occasion of the uplink PI based on the fourth control information.

The monitoring occasion of the uplink PI may also be determined by using the time domain location of the RUR. For example, the occasion for monitoring the uplink PI by the terminal device is located in an $n^{th}$ time domain symbol before an RUR start symbol, where n is a positive integer. Alternatively, the occasion for monitoring the uplink PI by the terminal device is located between a first RUR and a second RUR. The first RUR is adjacent to the second RUR, and a time domain start location of the second RUR is earlier than a time domain start location of the first RUR.

Alternatively, the monitoring occasion of the uplink PI may be a time domain range, and is determined by a corresponding RUR. For example, a start time point T1 of the RUR is used as a reference. [T1-p, T1-q] is a monitoring occasion of a corresponding uplink PI, where p and q are positive numbers, p is greater than or equal to q, and p is less than T1. In the foregoing example, the start time point of the RUR is used as the reference. Alternatively, an end time point may be used as the reference.

In addition, the uplink PI may also be sent in the RUR. In this case, q may also be less than 0. In another example, because UE has a processing time after receiving the PI, it is assumed that the processing time is Δ. Assuming that the end time point of the RUR is T2, it is meaningless to receive the PI after T2−Δ. Therefore, T1−q may also be limited to be less than or equal to T2−Δ.

To effectively reduce a quantity of times of blind detection performed by the terminal device on the uplink PI, a quantity of times of monitoring the uplink PI by the terminal device in one slot is less than or equal to 7 times.

This application further provides an indication design of an uplink PI, to be specific, how the uplink PI indicates the third time-frequency resource in the RUR. To reduce the quantity of times of blind detection performed by the terminal device on the uplink PI, a fixed quantity of bits may be used in a first field that is in the uplink PI and that is used to indicate the third time-frequency resource in the RUR. For example, the uplink PI includes a field with a length of 2 bits or 4 bits, to indicate the third time-frequency resource in the RUR. A value of a bit length of the first field needs to be tradeoff between an indication granularity and overheads of the uplink PI. A longer bit length of the first field indicates a finer indication granularity, but higher overheads of the uplink PI. On the contrary, a shorter bit length of the first field indicates smaller overheads of the uplink PI, but a coarser indication granularity. Consequently, invalid retransmission of uplink eMBB service data is caused. It may be understood that, in a multi-carrier scenario, an uplink PI may include a plurality of first fields that are separately used to indicate third time-frequency resources in RURs corresponding to a plurality of carriers, and each carrier corresponds to one first field.

When the length of the first field is 4 bits, a corresponding RUR includes four fourth time-frequency resources, and each bit in the first field corresponds to one fourth time-frequency resource in the RUR. As shown in (A) in FIG. 9, an RUR is divided into four fourth time-frequency resources in time domain. As shown in (B) in FIG. 9, an RUR is divided into two time units in time domain and is divided into two frequency domain units in frequency domain, and in total, the RUR is divided into four fourth time-frequency resources. As shown in (C) in FIG. 9, an RUR is divided into four fourth time-frequency resources in frequency domain. A specific segmentation method used by the RUR may be predefined in the protocol, or may be notified to the terminal device by using the signaling after being determined by the network device. For example, when there are four time domain symbols in the RUR, the segmentation method shown in (A) in FIG. 9 may be used, so that a finest indication granularity can be provided in time domain. When there are two time domain symbols in the RUR, the segmentation method shown in (B) in FIG. 9 may be used, and the third time-frequency resource is indicated in both time domain and frequency domain. When there is one time domain symbol in the RUR, the segmentation method shown in (C) in FIG. 9 may be used.

When the length of the first field is 2 bits, a corresponding RUR includes two fourth time-frequency resources, and each bit in the first field corresponds to one fourth time-frequency resource in the RUR. As shown in (D) in FIG. 9, an RUR is divided into two fourth time-frequency resources in time domain. As shown in (E) in FIG. 9, an RUR is divided into two fourth time-frequency resources in frequency domain. A specific segmentation method used by the RUR may be predefined in the protocol, or may be notified to the terminal device by using the signaling after being determined by the network device. For example, when there are four or two time domain symbols in the RUR, the segmentation method shown in (D) in FIG. 9 may be used. When there is one time domain symbol in the RUR, the segmentation method shown in (E) in FIG. 9 may be used.

This application further provides another indication design of an uplink PI, and the uplink PI indicates a start time of the third time-frequency resource. The terminal device stops sending uplink data at the start time indicated by the uplink PI. To be specific, the uplink PI notifies a time point, and the terminal device does not send uplink data after the time point, and does not continue to send uplink data until next scheduling.

In some scenarios, some time-frequency resources, for example, some special reserved resources, a downlink transmission resource in a time division duplex (TDD) system, or time-frequency resources used by some uplink reference signals, are not allowed to be preempted by uplink data transmission. These time-frequency resources that are not allowed to be preempted may be dynamically time-varying, or may be semi-statically configured. Consequently, the RUR may overlap these time-frequency resources that are not allowed to be preempted. There are two processing manners:

(1) A definition of the RUR remains unchanged, and the RUR may include some of the time-frequency resources that are not allowed to be preempted. In other words, the RUR may overlap the time-frequency resources that are not allowed to be preempted. Assuming that the time-frequency resource that cannot be preempted is a resource A, in S320 and S1120 in the embodiments of this application, the RUR needs to remove the resource A to obtain an updated RUR, and then related condition determining is performed based on the updated RUR.

(2) A range of the RUR is adjusted based on a definition or a configuration of the time-frequency resource that is not allowed to be preempted, so that the RUR does not overlap the time-frequency resources that are not allowed to be preempted.

Embodiment 2: Multi-Cell Scenario

Figure 9:
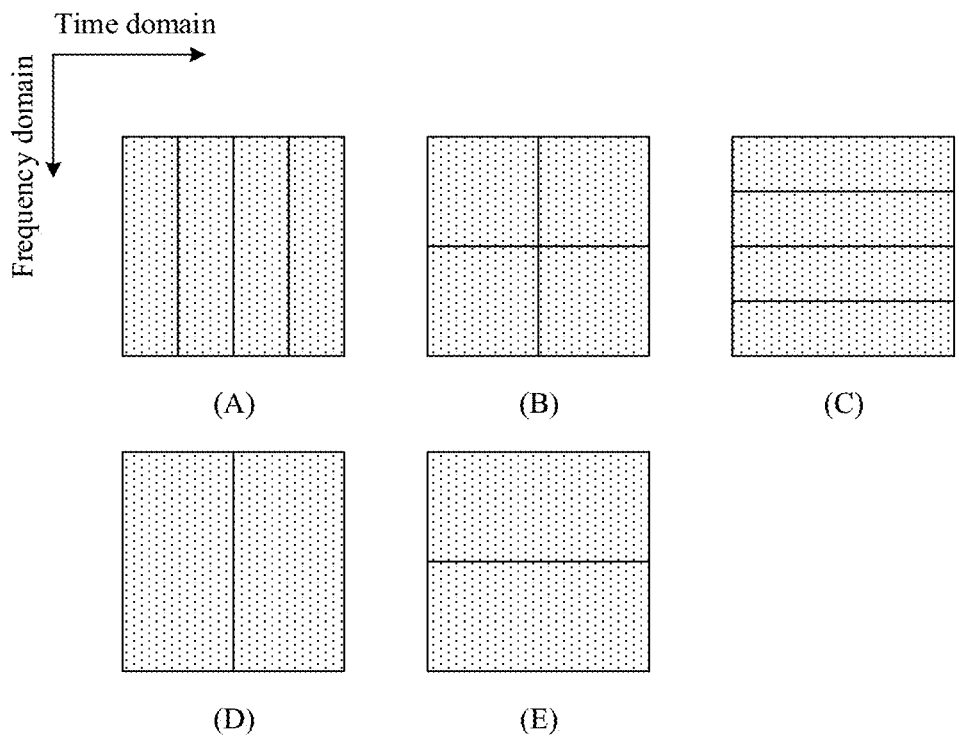
FIG. 9 is a schematic diagram of a resource division method for a reference uplink resource according to an embodiment of this application.
Figure 10:
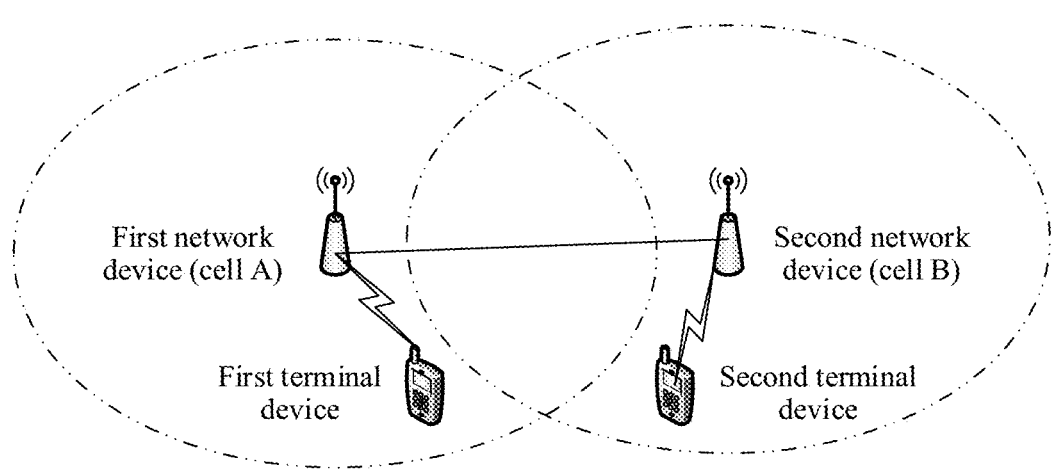
FIG. 10 is a schematic diagram of an inter-cell coordination scenario according to an embodiment of this application.

This application further provides a control information transmission method in an inter-cell coordination scenario. As shown in FIG. 10, there is a first terminal device in a coverage area of a cell A, and the cell A provides a wireless connection service for the first terminal device; there is a second terminal device in a coverage area of a cell B, and the cell B provides a wireless connection service for the second terminal device; and cell A is adjacent to cell B, and the coverage areas of the two cells partially overlap. The cell A and the cell B may be managed by a same network device, or may be managed by two different network devices. When the cell A and the cell B are managed by a same network device, information exchange between the cell A and the cell B is performed by using an internal message interface or an internal circuit of the network device. When the cell A and the cell B are separately managed by two different network devices, assuming that the cell A is managed by a first network device and the cell B is managed by a second network device, information exchange between the cell A and the cell B is performed by using a message interface between the first network device and the second network device. Although FIG. 9 shows only a scenario in which two cells are coordinated, a quantity of cells participating in coordination is not limited in this application.

The following uses an example in which the cell A and the cell B are separately managed by two different network devices for description. However, this embodiment of this application is also applicable to a scenario in which the cell A and the cell B are managed by a same network device.

When sending URLLC service data, the second terminal device is also interfered with by uplink data sent by the first terminal device that is located at a coverage edge of the cell A and that is close to the cell B. Therefore, when the second terminal device preempts a time-frequency resource to transmit the URLLC service data, the first terminal device in the cell A also needs to know a location at which the second terminal device preempts the time-frequency resource, and stops sending the uplink data at the location at which the second terminal device preempts the time-frequency resource. This avoids interference to the URLLC service data of the second terminal device, and improves reliability of transmitting the URLLC service data of the second terminal device. In other words, the first terminal device needs to monitor an uplink PI of the cell B sent by the second network device, and the PI is referred to as a second uplink PI. To monitor the second uplink PI sent by the second network device, the first terminal device first needs to determine a monitoring occasion of the second uplink PI.

According to the related description in Embodiment 1, the monitoring occasion of the uplink PI may be predefined in a protocol, or may be notified to the terminal device by using signaling after being determined by the network device, or may be determined based on an RUR. Further, the RUR may also be predefined in the protocol, or may be notified to the terminal device by using signaling after being determined by the network device.

When the monitoring occasion of the uplink PI is predetermined in the protocol, the first terminal device may determine, based on a definition in the protocol, the monitoring occasion of the second uplink PI of the cell B sent by the second network device.

When the monitoring occasion of the uplink PI is notified to the terminal device by the network device by using the signaling, the first terminal device may obtain the monitoring occasion of the second uplink PI of the cell B by using two methods: In one method, related signaling of the cell B is directly received. In the other method, the second network device sends related information about the monitoring occasion of the second uplink PI of the cell B to the first network device, and then the first network device sends the related information about the monitoring occasion of the second uplink PI of the cell B to the first terminal device by using the signaling.

When the monitoring occasion of the uplink PI is determined based on the RUR and the RUR is predefined in the protocol, the first terminal device may determine, based on a definition in the protocol, a second RUR corresponding to the second uplink PI of the cell B, and then determine the monitoring occasion of the second uplink PI based on the second RUR.

When the monitoring occasion of the uplink PI is determined based on the RUR, and the RUR is notified to the terminal device by using the signaling after being determined by the network device, the first terminal device may determine the monitoring occasion of the second uplink PI of the cell B by using two methods: In one method, related signaling of the cell B is directly received, to obtain related information about the second RUR corresponding to the second uplink PI, and the monitoring occasion of the second uplink PI is determined based on the second RUR. In the other method, the second network device sends, to the first network device, related information about the second RUR that is of the cell B and that corresponds to the second uplink PI, then the first network device sends the related information about the second RUR of the cell B to the first terminal device by using the signaling, and the first terminal device determines the monitoring occasion of the second uplink PI based on the related information about the second RUR.

For more detailed descriptions of the second uplink PI and the second RUR, refer to related descriptions of the uplink PI and the RUR in Embodiment 1.

Figure 11:
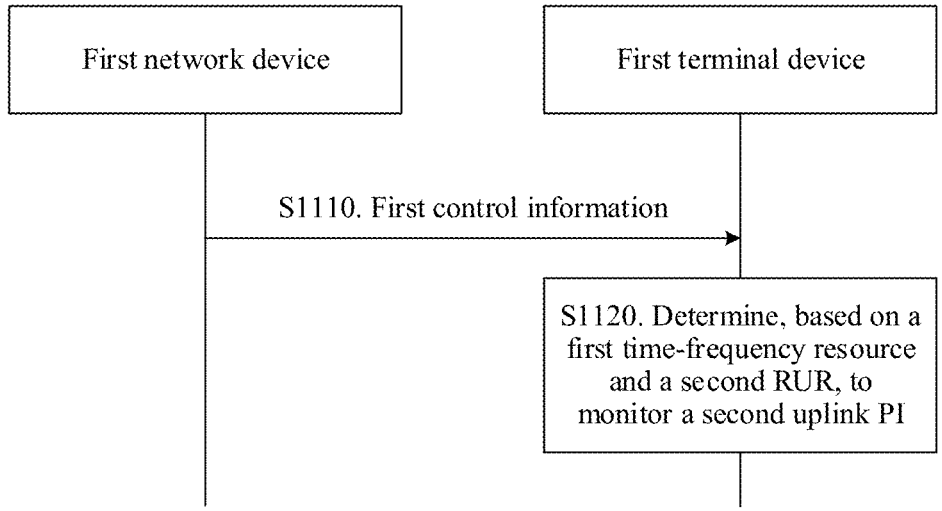
FIG. 11 is a schematic diagram of another control information transmission method according to an embodiment of this application.

As shown in FIG. 11, this application provides a control information transmission method.

S1110. The first network device sends first control information to the first terminal device. Correspondingly, the first terminal device receives the first control information from the first network device. The first control information is used to indicate the first terminal device to send uplink data on a first time-frequency resource.

S1120. The first terminal device determines, based on the first time-frequency resource and the second RUR, to monitor the second uplink PI or determine not to monitor the second uplink PI. The second uplink PI indicates fifth time-frequency resource information in the second RUR, and the second uplink PI is an uplink PI in a neighboring cell of the first terminal device. The neighboring cell of the first terminal device may be understood as that the first terminal device can receive a downlink signal of the neighboring cell and/or an uplink signal sent by the first terminal device can be received by a network device that manages the neighboring cell. In the scenario shown in FIG. 10, the neighboring cell of the first terminal device is the cell B. The fifth time-frequency resource information may be information about a time-frequency resource in which uplink data transmission is stopped, or may be information about time for stopping sending uplink data, or may be information about a time-frequency resource in which a transmission parameter is changed. When the first terminal device determines that the second uplink PI needs to be monitored, the first terminal device needs to further determine the monitoring occasion of the second uplink PI.

Specifically, the first time-frequency resource may be a time-frequency resource that is allocated by the first network device to the first terminal device and that is used to transmit eMBB service data. When the first time-frequency resource overlaps the second RUR, it is referred to as that a condition 3 is met, and the first terminal device determines to monitor the second uplink PI. It may be understood that the condition 3 herein means whether the first time-frequency resource overlaps the second RUR. When the first time-frequency resource does not overlap the second RUR, that is, the condition 3 is not met, the first terminal device determines not to monitor the second uplink PI. Whether the second uplink PI is monitored is determined by determining whether the first time-frequency resource overlaps the second RUR, thereby effectively avoiding blind detection performed on the second uplink PI by terminal devices that do not need to receive the second uplink PI.

Optionally, the first terminal device may determine, by determining whether a condition 4 is met, whether to monitor the second uplink PI. The condition 4 herein refers to whether the first terminal device can detect a downlink synchronization signal or another reference signal of the neighboring cell. When the first terminal device detects a downlink synchronization signal or another reference signal of the neighboring cell, it is considered that the condition 4 is met. It may be understood that the condition 3 and the condition 4 may be used separately, or may be used in combination. That is, when the condition 3 is met, the first terminal device determines to monitor the second uplink PI. Alternatively, when condition 4 is met, the first terminal device determines to monitor the second uplink PI. Alternatively, when both the condition 3 and the condition 4 are met, the first terminal device determines to monitor the second uplink PI.

Figure 12:
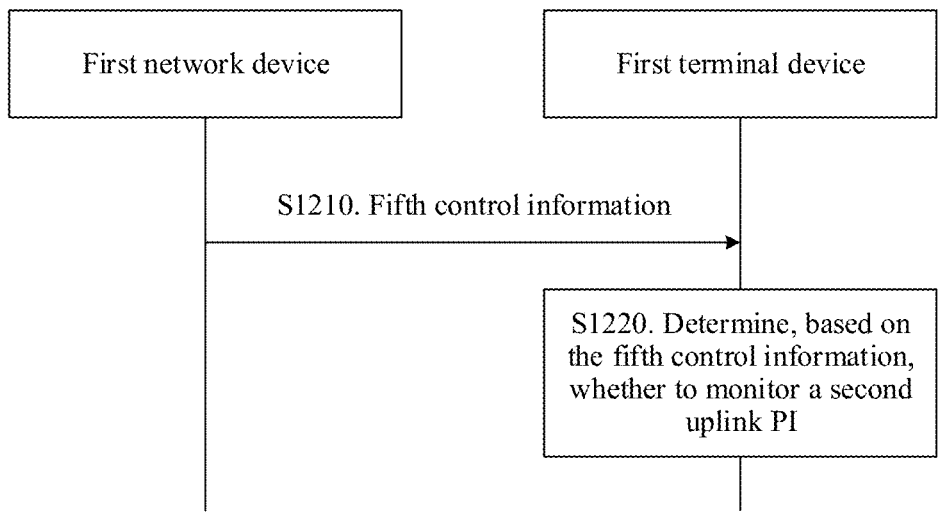
FIG. 12 is a schematic diagram of still another control information transmission method according to an embodiment of this application.

As shown in FIG. 12, this application provides a control information transmission method.

S1210. The first network device sends fifth control information to the first terminal device. Correspondingly, the first terminal device receives the fifth control information from the first network device. The fifth control information is used to indicate the first terminal device to monitor the second uplink PI or indicate whether the first terminal device monitors the second uplink PI, and the fifth control information may be carried by using signaling.

S1220. The first terminal device determines, based on the fifth control information, to monitor the second uplink PI or determine not to monitor the second uplink PI.

Specifically, for a more detailed design of the fifth control information, refer to related descriptions of the second control information in S520. When the first terminal device receives the fifth control information or when a received value of the fifth control information is a first value, it is referred to as that a condition 5 is met. The condition 5 herein means whether the first terminal device receives the fifth control information or whether the value of the fifth control information received by the first terminal device is the first value. It may be understood that the condition 5 may be used independently. To be specific, provided that the condition 5 is met, the first terminal device monitors the second uplink PI at a moment corresponding to the monitoring occasion of the second uplink PI. When the condition 5 is not met, the first terminal device determines not to monitor the second uplink PI. The condition 5 may also be used in combination with the condition 3 and/or the condition 4. For example, when the condition 3 and the condition 5 are met, the first terminal device determines to monitor the second uplink PI at the moment corresponding to the monitoring occasion of the second uplink PI. When either of the condition 3 and the condition 5 is not met, the first terminal device determines not to monitor the second uplink PI. For another example, when the condition 4 and the condition 5 are met, the first terminal device determines to monitor the second uplink PI at the moment corresponding to the monitoring occasion of the second uplink PI. When either of the condition 4 and the condition 5 is not met, the first terminal device determines not to monitor the second uplink PI. For another example, when the condition 3, the condition 4, and the condition 5 are all met, the first terminal device determines to monitor the second uplink PI at the moment corresponding to the monitoring occasion of the second uplink PI. When any one of the condition 3, the condition 4, and the condition 5 is not met, the first terminal device determines not to monitor the second uplink PI.

Different terminal devices may have different capabilities. For example, some terminal devices may receive an uplink PI; some terminal devices do not support receiving of an uplink PI; some terminal devices may receive an uplink PI in a cell, but do not support receiving of an uplink PI in a neighboring cell; and some terminals may receive an uplink PI in a cell and an uplink PI in a neighboring cell. The terminal device may report capability information about receiving an uplink PI to the network device. Specifically, the capability information may include at least one of the following: Not supporting receiving of an uplink PI, supporting receiving of an uplink PI, supporting receiving of an uplink PI in a cell but not supporting receiving of an uplink PI in a neighboring cell, supporting receiving of an uplink PI in a cell and supporting receiving of an uplink PI in a neighboring cell, a supported quantity of neighboring cells whose uplink PIs can be received. The supported quantity of neighboring cells whose uplink PIs can be received refers to a supported quantity of neighboring cells whose uplink PIs can be monitored. When scheduling a URLLC terminal device, the network device avoids that uplink time-frequency resources of UE that does not support receiving of the uplink PI are preempted.

In the foregoing embodiment provided in this application, the control information transmission method provided in this embodiment of this application is described from perspectives of the network device and the terminal device. It may be understood that, to implement the foregoing functions, the network device and the terminal device include corresponding hardware structures and/or software modules for performing the functions. With reference to the examples of units and method steps described in this embodiment provided in this application, this embodiment of this application can be implemented by hardware or a combination of hardware and computer software. Whether a function is performed by hardware or hardware driven by computer software may depend on application scenarios and design constraints of the technical solutions. A person skilled in the art may use different methods to implement the described functions for different application scenarios. This is not limited in this application.

Embodiment 3

Figure 13:
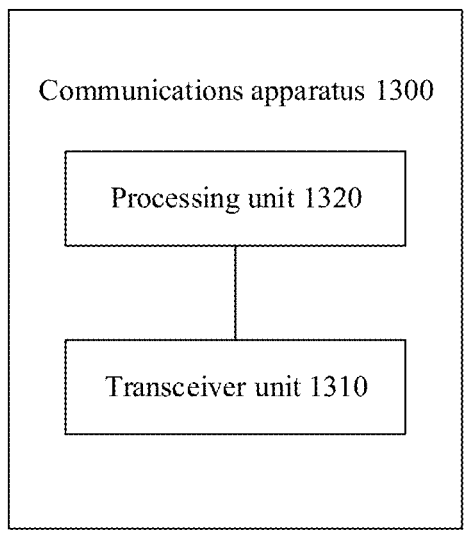
FIG. 13 is a schematic structural diagram of a communications apparatus according to an embodiment of this application.
Figure 14:
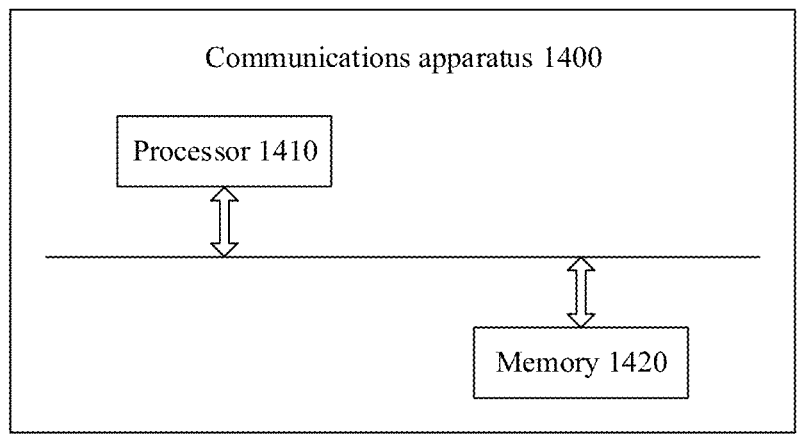
FIG. 14 is a schematic structural diagram of another communications apparatus according to an embodiment of this application.
Figure 15:
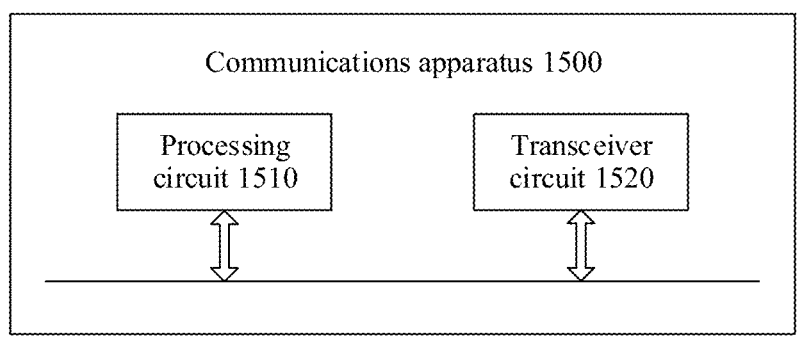
FIG. 15 is a schematic structural diagram of still another communications apparatus according to an embodiment of this application.

FIG. 13, FIG. 14, and FIG. 15 are schematic structural diagrams of three possible communications apparatuses according to an embodiment of this application. The communications apparatuses may be configured to implement functions of the terminal device in the foregoing method embodiments. Therefore, beneficial effects of the foregoing method embodiments can also be implemented. In this embodiment of this application, the communications apparatuses may be the terminal device 130 or the terminal device 140 shown in FIG. 1, or may be a chip applied to the terminal device.

As shown in FIG. 13, a communications apparatus 1300 includes a transceiver unit 1310 and a processing unit 1320.

The transceiver unit 1310 is configured to receive first control information, and the first control information is used to indicate to send uplink data on a first time-frequency resource.

The processing unit 1320 is configured to determine to monitor an uplink PI based on the first time-frequency resource and an RUR. The uplink PI indicates a third time-frequency resource in the RUR, and the third time-frequency resource is a time-frequency resource in which uplink data transmission is stopped.

The transceiver unit 1310 may be further configured to receive second control information, and the second control information is used to indicate to monitor the uplink PI.

The transceiver unit 1310 may be further configured to receive third control information. The third control information is used to indicate at least one of a time domain range, a time domain location, a frequency domain range, a frequency domain location, and a time-frequency location of the RUR.

The transceiver unit 1310 may be further configured to receive fourth control information, and the fourth control information is used to indicate an occasion for monitoring the uplink PI.

The uplink PI may be an uplink PI in a local cell, or may be an uplink PI in a neighboring cell. Herein, the local cell is a cell that provides a wireless connection service for the terminal device, and the neighboring cell is a neighboring cell of the terminal device.

For more detailed descriptions of the transceiver unit 1310 and the processing unit 1320, directly refer to related descriptions of the terminal device in the foregoing method embodiments. Details are not described herein again.

As shown in FIG. 14, a communications apparatus 1400 includes a processor 1410, and optionally, may further include a memory 1420. The memory 1420 may be configured to store a computer program or an instruction, or may be configured to store intermediate data processed by the processor. The processor 1410 may be configured to execute the computer program or the instruction stored in the memory 1420, or may be configured to execute a computer program or an instruction stored or fixed in the processor 1410. When executing the computer program or the instruction, the processor 1410 is configured to complete a function of the terminal device in the method embodiments. The processor 1410 and the memory 1420 communicate with each other by using an internal connection path, for example, may transmit a control signal and/or a data signal by using a bus. A quantity of the processors 1410 and a quantity of the memories 1420 included in the communications apparatus 1400 are not limited in this embodiment of this application.

As shown in FIG. 15, a communications apparatus 1500 includes a processing circuit 1510 and a transceiver circuit 1520. The processing circuit 1510 is configured to perform a function of the processing unit 1310 in this embodiment, and the transceiver circuit 1520 is configured to perform a function of the transceiver unit 1320 in this embodiment. The processing circuit and the transceiver circuit communicate with each other by using an internal circuit.

When the communications apparatus is a chip of a terminal device, the chip of the terminal device implements functions of the terminal device in the foregoing method embodiments. The chip of the terminal device receives information from another module (for example, a radio frequency module or an antenna) in the terminal device, and the information is sent by a network device to the terminal device.

Embodiment 4

The communications apparatuses shown in FIG. 13, FIG. 14, and FIG. 15 may be further configured to implement functions of the network device in the foregoing method embodiments. Therefore, beneficial effects of the foregoing method embodiments can also be implemented. In this embodiment of this application, the communications apparatuses may alternatively be the radio access network device 120 shown in FIG. 1, or may be a chip applied to the radio access network device.

As shown in FIG. 13, a communications apparatus 1300 includes a transceiver unit 1310 and a processing unit 1320.

The processing unit 1320 is configured to generate second control information, and the second control information is used to indicate to monitor an uplink PI. The uplink PI indicates a third time-frequency resource in an RUR, and the third time-frequency resource is a time-frequency resource in which uplink data transmission is stopped.

The transceiver unit 1310 is configured to send second control information.

The transceiver unit 1310 may be further configured to send third control information. The third control information is used to indicate at least one of a time domain range, a time domain location, a frequency domain range, a frequency domain location, and a time-frequency location of the RUR.

The transceiver unit 1310 may be further configured to send fourth control information, and the fourth control information is used to indicate an occasion for monitoring the uplink PI.

The uplink PI may be an uplink PI in a local cell, or may be an uplink PI in a neighboring cell.

For more detailed descriptions of the transceiver unit 1310 and the processing unit 1320, directly refer to related descriptions of the network device in the foregoing method embodiments. Details are not described herein again.

As shown in FIG. 14, a communications apparatus 1400 includes a processor 1410, and optionally, may further include a memory 1420. The memory 1420 may be configured to store a computer program or an instruction, or may be configured to store intermediate data processed by the processor. The processor 1410 may be configured to execute the computer program or the instruction stored in the memory 1420, or may be configured to execute a computer program or an instruction stored or fixed in the processor 1410. When executing the computer program or the instruction, the processor 1410 is configured to complete a function of the network device in the method embodiments. The processor 1410 and the memory 1420 communicate with each other by using an internal connection path, for example, may transmit a control signal and/or a data signal by using a bus. A quantity of the processors 1410 and a quantity of the memories 1420 included in the communications apparatus 1400 are not limited in this embodiment of this application.

As shown in FIG. 15, a communications apparatus 1500 includes a processing circuit 1510 and a transceiver circuit 1520. The processing circuit 1510 is configured to perform a function of the processing unit 1310 in this embodiment, and the transceiver circuit 1520 is configured to perform a function of the transceiver unit 1320 in this embodiment. The processing circuit and the transceiver circuit communicate with each other by using an internal circuit.

When the communications apparatus is a chip of a network device, the chip of the network device implements functions of the network device in the foregoing method embodiments. The chip of the network device sends information to another module (for example, a radio frequency module or an antenna) in the network device, and the information is sent to a terminal device.

In the embodiments of this application, unless otherwise stated, terms and/or descriptions between different embodiments are consistent and may be mutually referenced, and technical features in different embodiments may be combined according to an internal logical relationship thereof, to form a new embodiment.

It should be noted that the processor in the embodiments of this application may be a central processing unit (CPU), may be another general-purpose processor, a digital signal processor (DSP), an application specific integrated circuit (ASIC), a field programmable gate array (FPGA), or another programmable logical device, a transistor logical device, a hardware component, or any combination thereof. The general purpose processor may be a microprocessor or any regular processor or the like.

The method steps in the embodiments of this application may be implemented by hardware, or may be implemented by a processor by executing a software instruction. The software instruction may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a mobile hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network device or a terminal device. Certainly, the processor and the storage medium may exist in a sending device or a receiving device as discrete components.

All or some of the foregoing embodiments may be implemented by using software, hardware, firmware, or any combination thereof. When software is used to implement the embodiments, the embodiments may be implemented partially in a form of a computer program product. The computer program product includes one or more computer programs or instructions. When the computer program or instruction is loaded and executed on a computer, the procedures or functions in the embodiments of this application are all or partially performed. The computer may be a general-purpose computer, a dedicated computer, a computer network, or other programmable apparatuses. The computer program or instruction may be stored in a computer-readable storage medium, or may be transmitted by using the computer-readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

In this specification, "a plurality of" means two or more than two. The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally represents an "or" relationship between the associated objects, and the character "/" in a formula represents a "division" relationship between the associated objects.

It may be understood that numbers in the embodiments of this application are merely for differentiation for ease of description, and are not intended to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

The invention claimed is:

1. A method for receiving control information, the method comprising:
receiving, by a terminal device, second control information, wherein the second control information indicates to monitor an uplink preemption indication (PI), the uplink PI indicates a third time-frequency resource in a reference uplink resource (RUR), a time domain range of the RUR is from an $n^{th}$ time domain symbol to an mth time domain symbol after an occasion for monitoring the uplink PI, n and m are positive integers, n is less than or equal to m, time domain symbols in the time domain range are used for uplink data transmission, and the third time-frequency resource is a time-frequency resource in which the uplink data transmission is stopped; and
receiving, by the terminal device, third control information, wherein the third control information indicates at least one of the time domain range, a time domain location, a frequency domain range, a frequency domain location, and a time-frequency location of the RUR.

2. The method according to claim 1, wherein a frequency domain range of the RUR is a part or all of a frequency domain range of a first bandwidth part (BWP) used for the uplink data transmission.

3. The method according to claim 1, further comprising:
receiving fourth control information by the terminal device, wherein the fourth control information indicates the occasion for monitoring the uplink PI.

4. The method according to claim 1, wherein the time domain range of the RUR is adjusted based on a configuration of time-frequency resource that is not allowed to be preempted.

5. The method according to claim 1, wherein a fixed quantity of bits in a first field in the uplink PI indicates the third time-frequency resource in the RUR.

6. An apparatus, comprising:
a memory storing instructions; and
one or more processors coupled to the memory, wherein the one or more processors are configured to execute the instructions to cause the apparatus to:
receive second control information, wherein the second control information indicates to monitor an uplink preemption indication (PI), the uplink PI indicates a third time-frequency resource in a reference uplink resource (RUR), a time domain range of the RUR is from an $n^{th}$ time domain symbol to an mth time domain symbol after an occasion for monitoring the uplink PI, n and m are positive integers, n is less than or equal to m, time domain symbols in the time domain range are used for uplink data transmission, and the third time-frequency resource is a time-frequency resource in which the uplink data transmission is stopped; and receive third control information, wherein the third control information indicates at least one of the time domain range, a time domain location, a frequency domain range, a frequency domain location, and a time-frequency location of the RUR.

7. The apparatus according to claim 6, wherein a frequency domain range of the RUR is a part or all of a frequency domain range of a first bandwidth part (BWP) used for the uplink data transmission.

8. The apparatus according to claim 6, wherein the one or more processors are further configured to:

receive fourth control information, wherein the fourth control information indicates the occasion for monitoring the uplink PI.

9. The apparatus according to claim 6, wherein the time domain range of the RUR is adjusted based on a configuration of time-frequency resource that is not allowed to be preempted.

10. The apparatus according to claim 6, wherein a fixed quantity of bits in a first field in the uplink PI indicates the third time-frequency resource in the RUR.

11. An apparatus comprising:

a memory storing instructions; and one or more processors coupled to the memory, wherein the one or more processors are configured to execute the instructions to cause the apparatus to:

send second control information, wherein the second control information indicates to monitor an uplink preemption indication (PI), the uplink PI indicates a third time-frequency resource in a reference uplink resource (RUR), a time domain range of the RUR is from an $n^{th}$ time domain symbol to an mth time domain symbol after an occasion for monitoring the uplink PI, n and m are positive integers, n is less than or equal to m, time domain symbols in the time domain range are used for uplink data transmission, and the third time-frequency resource is a time-frequency resource in which the uplink data transmission is stopped; and send third control information, wherein the third control information indicates at least one of the time domain range, a time domain location, a frequency domain range, a frequency domain location, and a time-frequency location of the RUR.

12. The apparatus according to claim 11, wherein a frequency domain range of the RUR is a part or all of a frequency domain range of a first bandwidth part (BWP) used for the uplink data transmission.

13. The apparatus according to claim 11, wherein the one or more processors are further configured to:

send fourth control information, wherein the fourth control information indicates the occasion for monitoring the uplink PI.

14. The apparatus according to claim 11, wherein the time domain range of the RUR is adjusted based on a configuration of time-frequency resource that is not allowed to be preempted.

15. The apparatus according to claim 11, wherein a fixed quantity of bits in a first field in the uplink PI indicates the third time-frequency resource in the RUR.

* * * * *

UNITED STATES PATENT AND TRADEMARK OFFICE
CERTIFICATE OF CORRECTION

PATENT NO. : 11,251,930 B2
APPLICATION NO. : 16/915757
DATED : February 15, 2022
INVENTOR(S) : Du et al.

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Signed and Sealed this
Nineteenth Day of July, 2022

Katherine Kelly Vidal
Director of the United States Patent and Trademark Office